United States Patent
Goyal et al.

(10) Patent No.: US 7,006,962 B1
(45) Date of Patent: Feb. 28, 2006

(54) DISTRIBUTED DELAY PREDICTION OF MULTI-MILLION GATE DEEP SUB-MICRON ASIC DESIGNS

(75) Inventors: Saket Goyal, Milpitas, CA (US); Santhanakrishnan Raman, Mountain View, CA (US); Prabhakaran Krishnamurthy, Cupertino, CA (US); Prasad Subbarao, San Jose, CA (US); Manjunatha Gowda, Santa Clara, CA (US)

(73) Assignee: LSI Logic Corporation, Milpitas, CA (US)

( * ) Notice: Subject to any disclaimer, the term of this patent is extended or adjusted under 35 U.S.C. 154(b) by 699 days.

(21) Appl. No.: 09/997,888

(22) Filed: Nov. 29, 2001

(51) Int. Cl.
*G06F 17/50* (2006.01)

(52) U.S. Cl. ............... 703/18; 716/2; 716/9; 709/107
(58) Field of Classification Search ................ 703/18; 716/2, 7, 9, 10; 709/107; 326/104
See application file for complete search history.

(56) References Cited

U.S. PATENT DOCUMENTS

| | | | |
|---|---|---|---|
| 6,263,478 B1 * | 7/2001 | Hahn et al. ................. 716/10 |
| 6,622,291 B1 * | 9/2003 | Ginetti ......................... 716/9 |
| 2001/0010090 A1 * | 7/2001 | Boyle et al. ................... 716/2 |
| 2001/0015658 A1 * | 8/2001 | Kousai et al. ............. 326/104 |
| 2003/0084416 A1 * | 5/2003 | Dai et al. ...................... 716/7 |
| 2004/0006584 A1 * | 1/2004 | Vandeweerd ............... 709/107 |

OTHER PUBLICATIONS

Kapadia et al., "Using partitioning to help convergence in the standard-cell design automation methodology", ACM, Jun. 1999.*

Zhang et al., "Statistically estimating path delay fault coverage in combinational circuits", IEEE 1995.*

* cited by examiner

*Primary Examiner*—Paul L. Rodriguez
*Assistant Examiner*—Kandasamy Thangavelu
(74) *Attorney, Agent, or Firm*—Sawyer Law Group

(57) ABSTRACT

A method and system for predicting delay of a multi-million gate sub-micron ASIC design is disclosed. The method and system include automatically partitioning a netlist into at least two logic cones, and running respective instances of a delay prediction application on the logic cones on at least two computers in parallel.

19 Claims, 5 Drawing Sheets

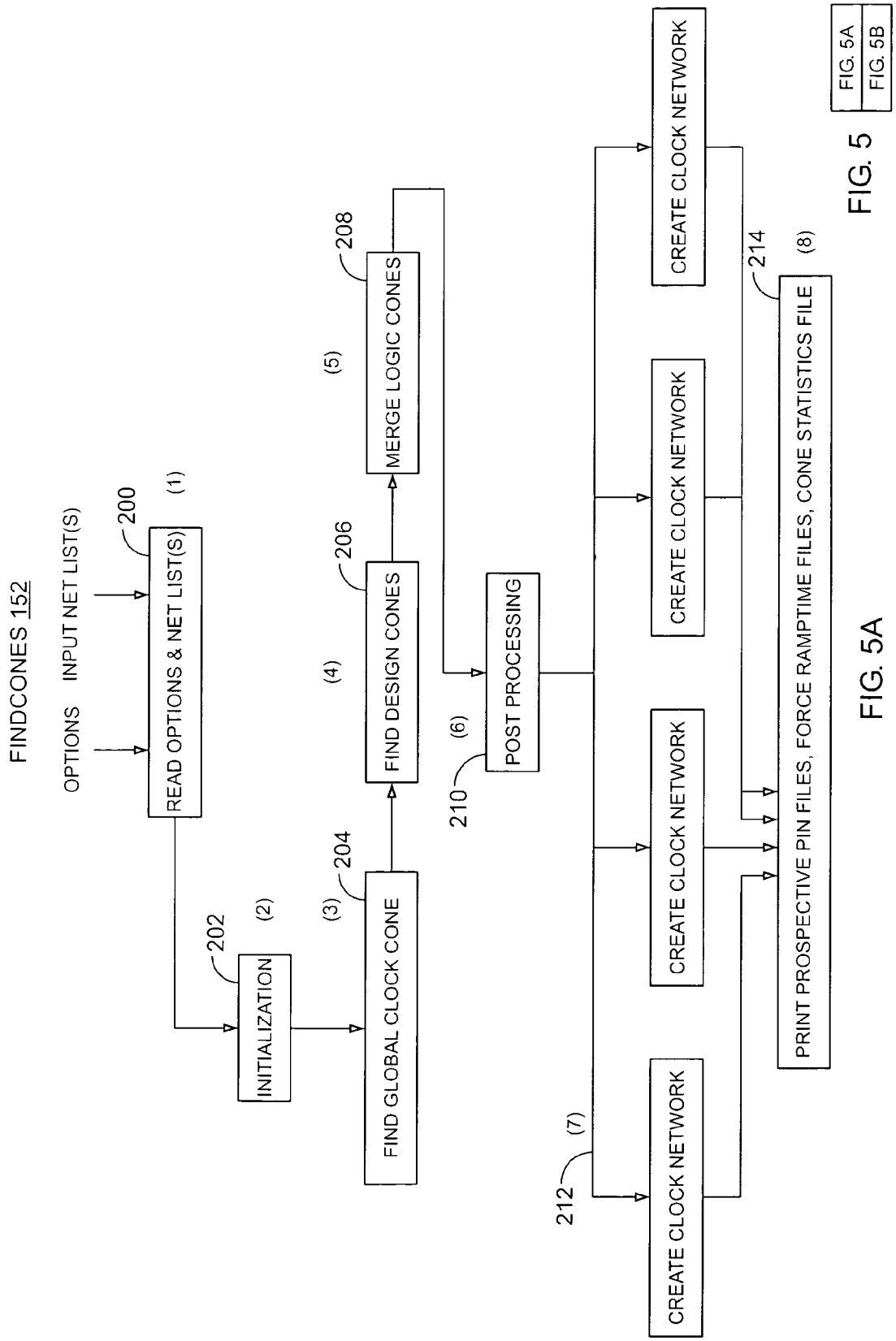

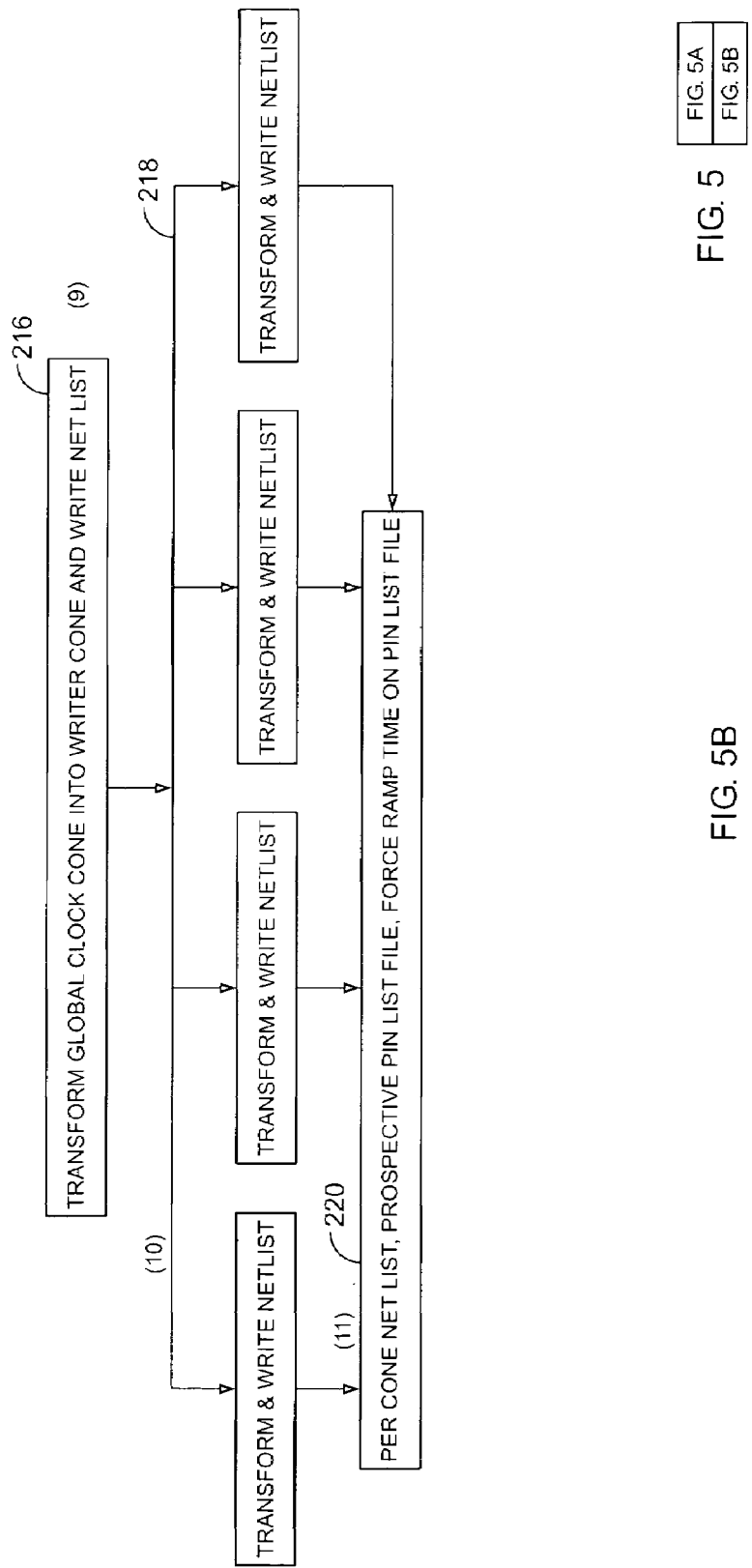

DISTRIBUTED DELAY PREDICTION OF MULTI-MILLION GATE DEEP SUB-MICRON ASIC DESIGNS

FIELD OF THE INVENTION

The present invention relates to ASIC design methodologies, and more particularly to a method and system for predicting delays in multi-million gate sub-micron ASIC designs.

BACKGROUND OF THE INVENTION

With innovative technologies, ASIC manufacturers are able to deliver system complexities up to 15-million gates on a single chip. Complete systems comprising cores, memories, and random logic are integrated on a single piece of silicon. Designers may design and verify a complete system for sign-off by submitting complex system models to electronic design automation (EDA) and verification and floor-planning tools to design and verify the complete system.

FIG. 1 is a block diagram illustrating a conventional ASIC design flow. The design flow includes a front-end design process that creates a logical design for the ASIC, and a back-end design process that creates a physical design for the ASIC. The front-end design process begins with providing a design entry 10 for an electronic circuit that is used to generate a high-level electronic circuit description, which is typically written in a Hardware Description Language (HDL) 12. Although many proprietary HDLs have been developed, Verilog HDL and VHDL are the major standards.

The design includes a list of interconnections that need to be made between the cells of the circuit; but physical properties for the interconnects have yet to be determined. Therefore, the designer needs an estimation of physical properties to help determine timing within circuit. Interconnect data from previous designs are used to generate interconnect statistical data to use as the estimation in step 14. The interconnect statistical data is used to create a wire load model 16, which defines the resistance, capacitance, and the area of all nets in the design. The statistically generated wire load model 16 is used to estimate the wire lengths in the design and define how net delays are computed.

The HDL 12 and the wire load model 16 are then input into a logic synthesis tool 18 to generate a list of logic gates and their interconnections, called a "netlist" 20. It is important to use wire load models 16 when synthesizing a design, otherwise, timing information generated from synthesis will be optimistic in the absence of net delays. The timing information will also be inaccurate when a poor wire load model 16 is used.

Next, system partitioning is performed in step 22 in which the physical design is partitioned to define groupings of cells small enough to be timed accurately with wire load models 16 (local nets). The resulting design typically includes many cells with many interconnect paths. A prelayout simulation is then performed in step 24 with successive refinement to the design entry 10 and to logic synthesis 18 to determine if the design functions properly.

After prelayout simulation 24 is satisfactory, the back-end design process begins with floor planning in step 26 in which the blocks of the netlist 20 are arranged on the chip. The locations of the cells in the blocks are then determined during a placement process in step 28. A routing process makes connections between cells and blocks in step 30. Thereafter, circuit extraction determines the resistance and capacitance of the interconnects in step 32.

After circuit extraction, a parasitic extraction process is performed in which a delay prediction application calculates the net delays across the entire design in step 33. The net delays are then input to a post-layout simulation in step 34, with successive refinement to floor planning 26 as necessary.

FIG. 2 is a block diagram illustrating a conventional delay prediction process performed after parasitic extraction. Delay prediction is typically performed by a monolithic software application 40 running on a server 42 or mainframe that estimates the delays across all the gates represented in the netlist 20, and outputs the estimated delays as a standard delay format (SDF) output file 44.

Conventional delay prediction process is slow and resource intensive. For example, delay prediction for a 10 million gate ASIC design may take up to two days to complete. If the subsequent post layout simulation proves inaccurate or the netlist 20 is changed, then the entire physical design process, including the delay prediction, must be repeated. The process is resource intensive because it requires huge physical memory configuration and extremely fast CPUs to run the delay prediction software application 40. For example, to adequately perform a delay prediction calculation for a 10 million gate design, an enterprise class server with 16 GB of physical memory is required, such as a SUN E4500 server. And because the delay prediction is so resource intensive, the use of other software tools on the server are precluded. Therefore, the delay prediction process is not only time-consuming, but is also expensive in terms of hardware requirements.

Previous attempts have been made to speed the delay prediction process. One approach attempted to increase the efficiency of the sequential delay prediction calculations by identifying performance bottlenecks in the delay prediction application 40 and optimizing them to speed up the overall process. This approach only resulted in minimal improvements and failed to have a significant effect on the overall time for the process 40 to run. Another approach attempted to improve runtime by using a multi-threaded delay prediction application, rather than a single-threaded application. Although multithreading improved runtime somewhat, multithreading was not sufficient for reducing delay prediction runtimes on very large designs. In addition, both approaches still required expensive hardware to run the delay prediction application 40.

Accordingly, what is needed is an improved method for performing delay prediction of multi-million gate sub-micron ASIC designs. The delay prediction process should result in significant time improvements over the monolithic application approach and require less expensive hardware resources. The present invention addresses such a need.

SUMMARY OF THE INVENTION

The present invention provides a method and system for delay prediction of multi-million gate sub-micron ASIC designs. The method and system include automatically partitioning a netlist into at least two logic cones, and running respective instances of a delay prediction application on the logic cones on at least two computers in parallel. According to the system and method disclosed herein, the present invention provides a distributed parallel approach for performing delay prediction that significantly improves total run time over the monolithic approach. For a 10 million gate ASIC design for example, the parallel delay predication of the present invention takes approximately 4–6 hours versus 2 days for the monolithic approach. And because delay prediction is performed on small logic blocks in parallel, the delay prediction application can be run on less expensive workstations, rather than requiring an enterprise class server or mainframe.

BRIEF DESCRIPTION OF THE DRAWINGS

FIG. 5 is a flow chart of the findcones program a preferred embodiment of the present invention.

DETAILED DESCRIPTION

The present invention relates to a process for predicting timing delays for deep sub-micron ASIC designs. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The present invention provides a method and system for performing delay prediction of a multi-million gate sub-micron ASIC design by partitioning the design so that the delay prediction takes significantly less time than the monolithic approach, and doesn't require huge servers or main-frames to perform the estimation. Instead of running the delay prediction application on a server or mainframes, the present invention partitions the design into smaller pieces so that the delay prediction process may be distributed across widely available and affordable workstations and desktop computers. More specifically, the present invention partitions the netlist into multiple timing-independent blocks of logic called cones, and a delay prediction application is run on each cone independently and in parallel on different computers. Because each delay prediction application now has to process less number of nets, run time decreases drastically for each cone. According to the present invention, the parallel approach to performing delay prediction significantly improves total run time over the monolithic approach and requires less costly hardware resources.

Figure 1:
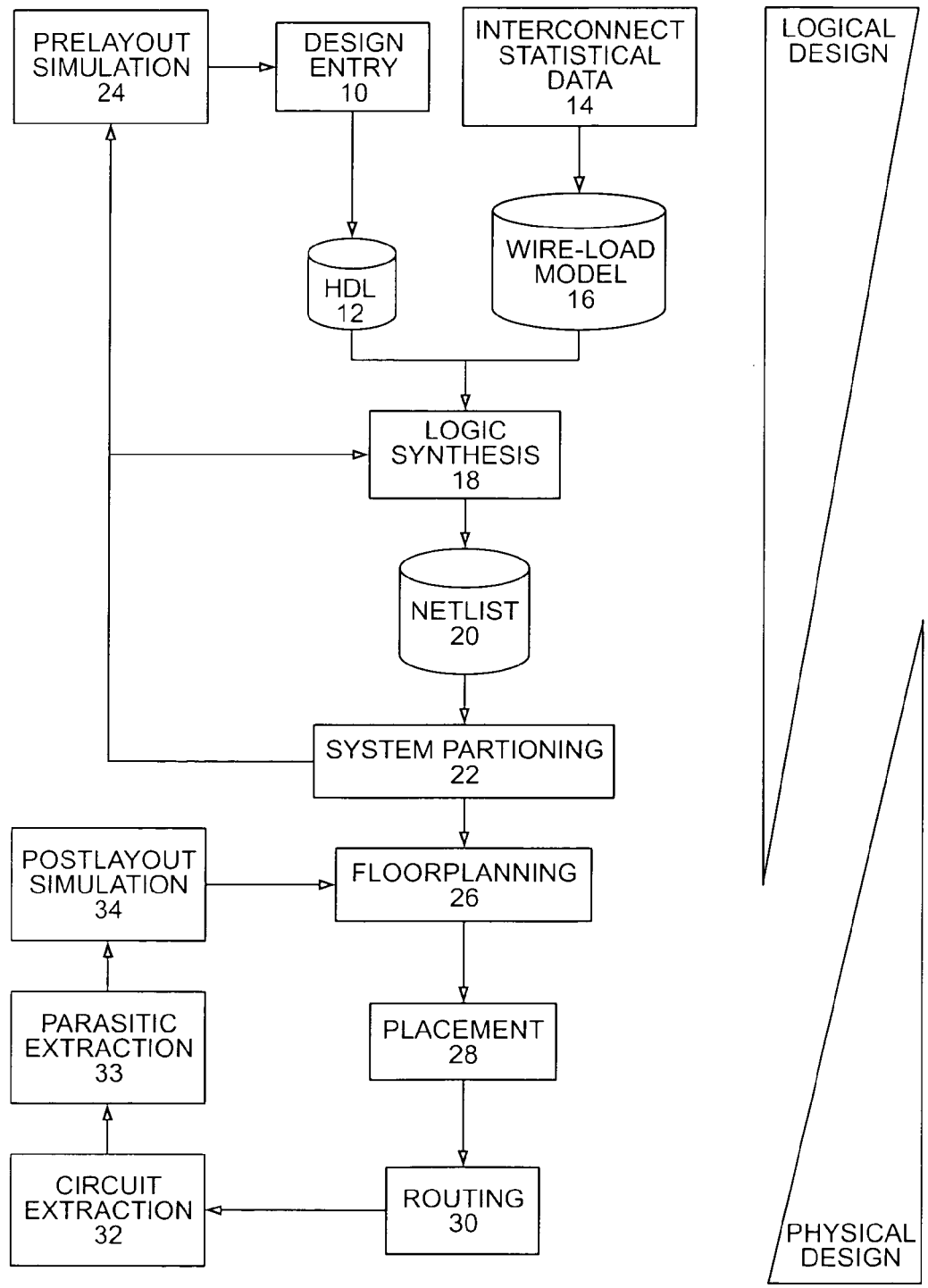
FIG. 1 is a block diagram illustrating a conventional design flow for fabricating an ASIC.
Figure 2:
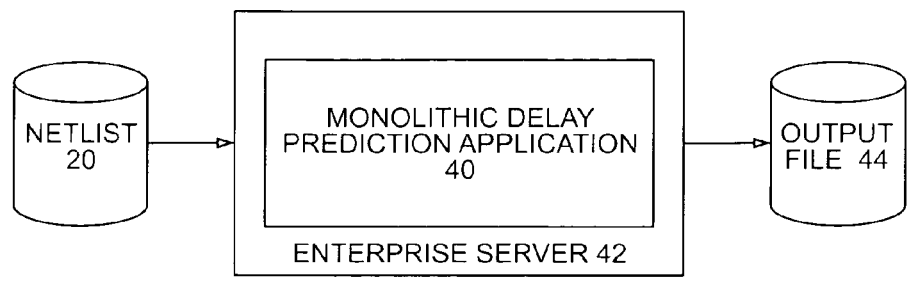
FIG. 2 is a block diagram illustrating a conventional delay prediction process performed during parasitic extraction.
Figure 3:
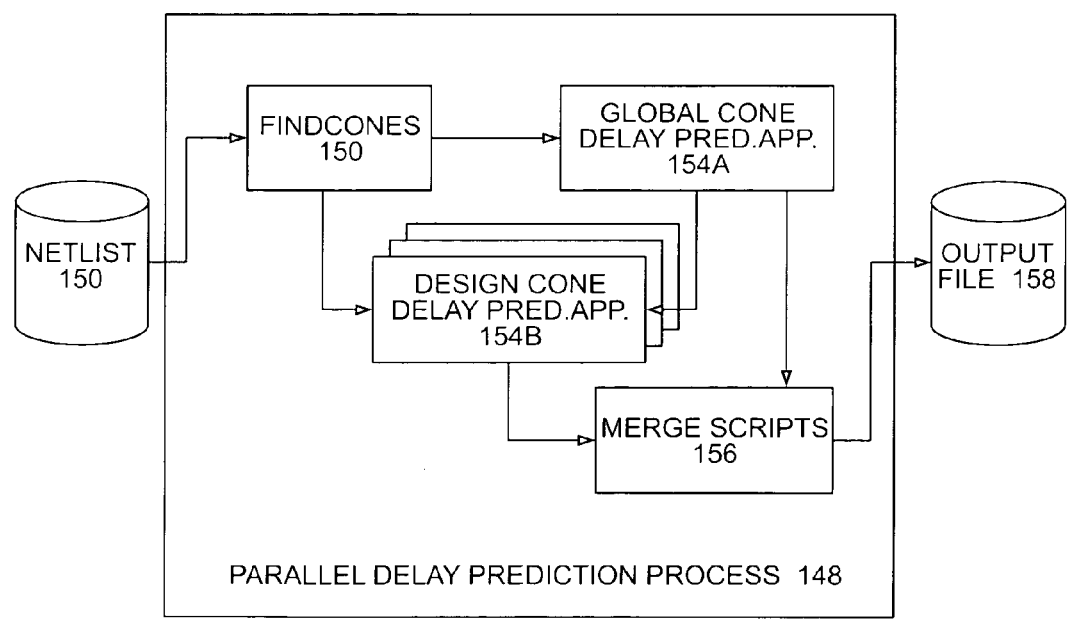
FIG. 3 is a flow diagram illustrating the software components of the parallel delay prediction process in accordance with the preferred embodiment of the present invention.

FIG. 3 is a flow diagram illustrating the software components of the parallel delay prediction process in accordance with the preferred embodiment of the present invention. According to the present invention, the parallel delay prediction process 148 replaces the monolithic delay prediction application 40, but accepts a netlist 150 as user input, and produces a standard delay format (SDF) output file 158 as output. Consequently, customers submitting the ASIC design for fabrication will see no difference in the input or output to the process. In a preferred environment, the parallel delay prediction process 148 includes a findcones program 152, multiple instances of the delay prediction application 154*a* and 154*b*, which are run on different computers, and merge scripts 156.

Figure 4:
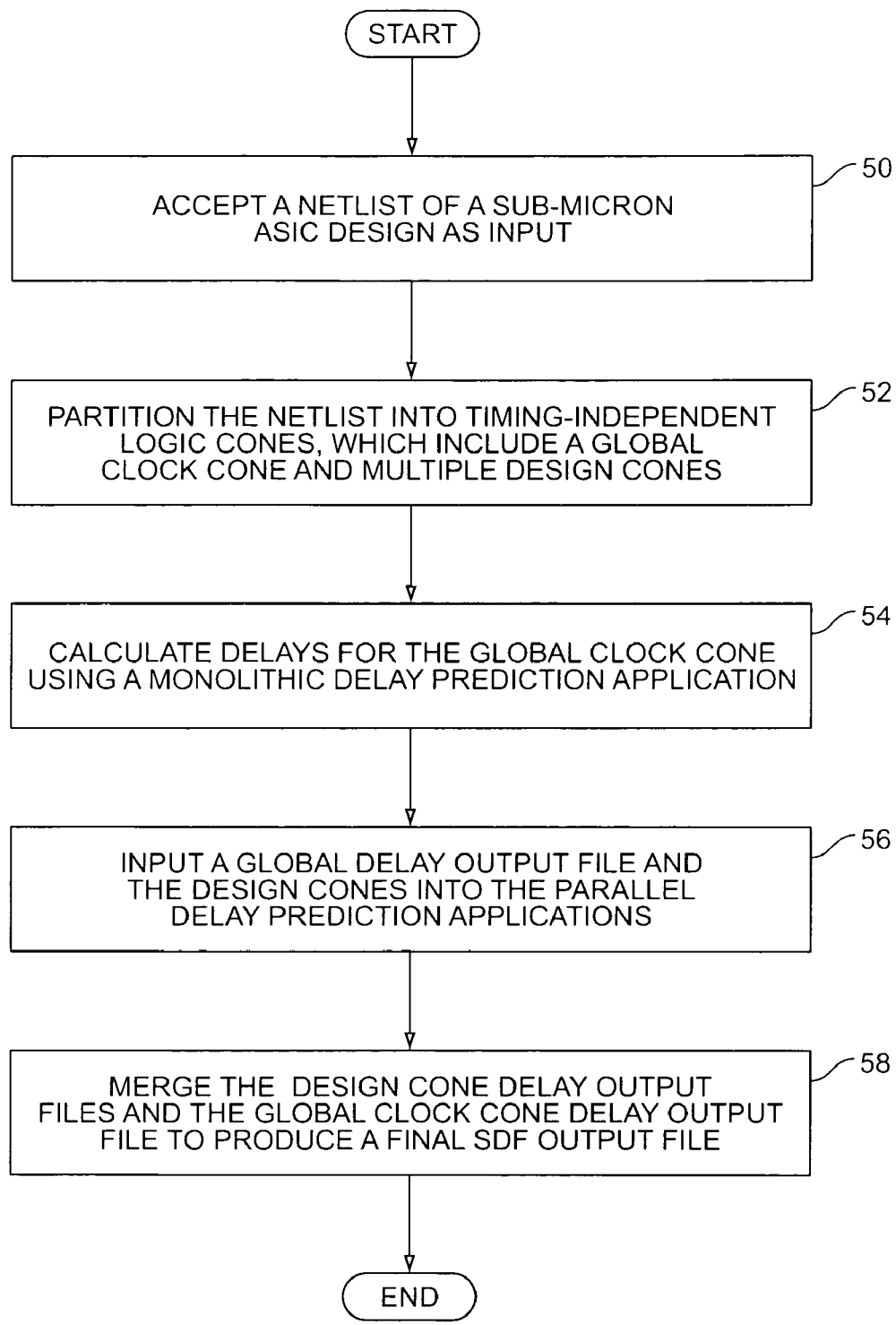
FIG. 4 is a flow chart illustrating the process of performing parallel delay prediction in according to the preferred embodiment of the present invention.

FIG. 4 is a flow chart illustrating the process of performing parallel delay prediction in according to the preferred embodiment of the present invention. The process begins by accepting the netlist 150 of a deep sub-micron ASIC design as input in step 50. In a preferred embodiment, the netlist 150 includes millions of gates. Referring to both FIGS. 3 and 4, in step 52 the findcones program 152 partitions the netlist 150 into timing-independent logic cones, which include a global clock cone and multiple radius design cones. Timing-independent means that the timing effect of one logic cone does not propagate to, or affect, another cone in the design in any way. The findcones program 152 identifies timing-independent cones of logic by starting with a particular terminating point and examining all gates and paths feeding into it. The findcones program 152 then traces backwards along these paths of logic to determine timing dependencies.

The findcones program 152 begins by identifying all clock networks, reset pins, and logic controlled by a clock throughout the circuit in order to form the global clock cone. The multiple design cones are then formed by examining the remaining circuits. For a 10 million gate design, the design is preferably partitioned into 40 design cones.

The findcones program 152 partitions the netlist 150 in a manner that not only produces timing-independent cones, but also produces cones that are balanced. Balanced cones means that each cone produced by the partitioning should have relatively the same number of gates so that the delay prediction applications 154*b* that are run in parallel can process each logic cone in approximately the same amount of time. For example, assume that a 10 million-gate design is partitioned into 40 logic cones, then each of the 40 logic cones should include approximately 250,000 gates.

After the last delay output file has been created, the radius design cone delay output files and the global clock cone delay output file are merged by the merge scripts 156 to produce a final SDF output file 158 in step 58. According to the present invention, the parallel delay prediction process 148 results in two benefits. One benefit is increased customer productivity. Due to partitioning and parallel processing, the parallel delay prediction process 148 requires only 4–6 hours to complete for a 10 million gate ASIC design which is a significant improvement over the turnaround time for the monolithic approach. Another benefit is that the parallel delay prediction process 148 is scalable and predictable. That is, larger designs may be processed in the same amount of time by adding a proportionate number of computers. For example, delay prediction far a 20 million gate ASIC design may be processed in same time as a 10 million gate ASIC design by doubling the number of computers.

After the delays for the global clock cone are calculated, the global clock cone delay output file and the design cones are used as input to the parallel delay prediction applications 154*b* in step 56. In a preferred embodiment, a series of networked computers are used to run multiple instances of the delay predication applications 154*b*. Preferably, one computer is allocated to run one instance of the delay prediction application 154*b*, and each delay prediction application 154*b* performs delay calculations on one design cone. The delay prediction applications 154*b* should be started on their respective computers at the same time so that delay output files for each cone are produced at approximately the same time.

After the last delay output file has been created, the radius design cone delay output files and the global clock con delay output file are merged by the merge scripts 156 to produce a final SDF output file 158 in step 58. According to the present invention, the parallel delay prediction process 148 results in two benefits. One benefit is increased customer productivity. Due to partitioning and parallel processing, the parallel delay prediction process 148 requires only 4–6 hours to complete for a 10 million gate ASIC design, which is a significant improvement over the turnaround time for the monolithic approach. Another benefit is that the parallel delay prediction process 148 is scalable and predictable. That is, larger designs may be processed in the same amount of time by adding a proportionate number of computers. For example, delay prediction for a 20 million gate ASIC design may be processed in same time as a 10 million gate ASIC design by doubling the number of computers.

FIG. 5 is a flow chart illustrating operation of the findcones program 152 in further detail according to a preferred embodiment of the present invention. The findcones program 152 begins by reading the input netlist 150 and any user options in step 200. In a preferred embodiment, the findcones program 152 reads the netlist 150 using a netlist database infrastructure API. In step 202, all data structures in the netlist 150 related to cone traversal are initialized. Several tables are also created which hold pin information based on pin properties, e.g., a table is created which holds all output pins of flip-flops/memories, as described below.

During the initialization, it is determined which data structures are clock pins, and which are focal points for traversal. A cone is defined as starting from a pin of a flip-flop, memory, or primary output/inout. These starting pins are also called focal points of a cone. Focal points are identified as a pin which does not have arcs to output pins of that cell (flip-flop, memory).

Cone terminating points are primary input and output pins of flip-flops and memories. Thus, traversal starts from the focal point of the cone and all pins are found along the path of traversal until the primary input or output pin of a flip-flop or memory is found. During the traversal, if an output pin of a leaf instance is found, the traversal continues for all input/inout pins which have arcs incident on the pin. If during the traversal, input of a combinational cell (a cell which is not a flip-flop or memory) is hit, the net pin is called a prospective pin, and is placed in a prospective pin list for the cone. Other pins are placed into a pin list for the cone. Thus, a pin can only be in the pin list or in the prospective pin list of a cone. The prospective pin list is kept to just calculate the interconnect delays for those nets. The delay prediction applications uses the list of prospective pins for a cone and does not write an I/O path delay statement in the output SDF file for those instances when any pin of the cells is in the prospective pin list.

After initialization, the global and clock cones are found in step 204. A global cone is a cone containing all of the input pins of flip-flops and memories which are not part of regular focal points. First, all clock cones are traversed starting from all the clock pins found during initialization. All these pins are part of the global cone. While creating this cone, no pin in the global cone is part of the prospective pin list.

After the global cone is found, the normal design cones are found in step 206. Traversal is started from the focal points and is terminated on the terminating points, as described above. A new design cone is not created until the current design cone has a number of pins that is at least (total pins)/(2×number of computers). After finding all the design cones, each design cone has three lists: 1) a pin list, 2) a prospective pin list, and 3) a storage instance list.

After finding all of the design cones, the number of design cones generated may be more than the number of computers available. Therefore, the design cones may be merged in step 208. In this step, if the number of design cones generated is more than the number of computers available, then the smaller design cones are merged into the bigger design cones to generate a number of design cones equal to the number of available computers.

After merging the design cones, there may be some pins that have not been traversed. Therefore, post processing is performed to place those pins into the global clock cone in step 210. The result of post processing is that the global clock cone may have prospective pins. These prospective pins are traversed in the same fashion as the normal design cones except that the focal points are not flip-flop pins.

After post processing, a clock network is created in all design cones to force ramptime on clock pins of the flip-flops/memories in step 212. As each cone contains the list of storage instances that are in the cone, traversal is started from all the clock pins of those instances and the clock network is created. In this case, only clock and non-leaf pins are inserted in the cone. Leaf instance pins are not inserted, as only nets, which are connected to the clock pin, are needed. A leaf instance list is also maintained for the cone which contains the storage instance (flip-flop and memories). This is done to create the global network so statements to force ramptimes on pins can be specified in a delay prediction control file when the delay prediction application is run on a cone. A delay prediction control file which contains all the pins on which force ramptime has to be specified is generated for each cone. This file is then given to the delay prediction application 154a that runs the global cone.

After the clock network is created, the prospective pin files, force ramptime control files, and cone statistic files are printed for each cone in step 214. A file describing the pin distribution for each cone is also written to help understand how well the partitioning has been performed. The global clock cone object is transformed into a writer cone object and a write netlist method is invoked to write the cone in the form of a hierarchical netlist in step 216. In this step, the global clock cone is first converted into a writer cone. For all the pins (pin list and prospective pin list), a hierarchy is created and all names except the module names, are retained.

All other logic cones are also transformed into writer cones in step 218. Since each cone is independent of the other, they are processed in parallel by using multithreading techniques. The findcones program 152 then generates a list of files for each cone in step 220. In a preferred embodiment, the files include a Verilog netlist, the prospective pin list file, and the force ramp time pin list file.

A method and system for providing distributed delay prediction for multimillion gate deep sub-micron ASIC designs has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for predicting delay of a mufti-million gate sub-micron ASIC design, the method comprising:
   (a) automatically partitioning a netlist into at least two timing-independent logic cones such that a timing effect of a first logic cone does not propagate to, or affect, a second logic cone in the design; and
   (b) running respective instances of a delay prediction application on the timing-independent logic cones on at least two computers in parallel.

2. The method of claim 1 wherein partitioning the netlist includes partitioning the netlist into one global clock cone and multiple design cones.

3. The method of claim 2 further including:
   (c) merging outputs from the instances of the delay prediction application into a final output file.

4. The method of claim 3 further including using a partitioning program to automatically partition the netlist.

5. The method of claim 3, wherein merging the outputs from the instances of the delay prediction application into the final output file includes merging each output into a standard delay format (SDF) output file.

6. The method of claim 4 further including:
   running the global clock cone through a monolithic delay prediction application.

7. The method of claim 6 further including:
   inputting output from the monolithic delay prediction application and the design cones into the respective instances of delay prediction application.

8. A method for predicting delay of a multi-million gate ASIC design, the method comprising:
   (a) partitioning a netlist into timing-independent cones including a global clock cone and multiple design cones;
   (b) performing delay calculation on the global clock cone and producing an output;
   (c) performing delay calculation on the multiple design cones in parallel using as input the output from delay calculation on the global clock cone; and
   (d) merging results from the delay calculations on the design cones and the delay calculation on the global clock cone into an output file.

9. The method of claim 8 wherein step (a) further includes:
   (i) partitioning the netlist so that each of the multiple design cones includes approximately a same number of gates.

10. The method of claim 9 wherein step (b) further includes:
    (i) forming the global clock cone by identifying clock networks, reset pins, and logic controlled by a clock throughout the ASIC design.

11. The method of claim 10 wherein step (b) further includes:
    (ii) calculating delays for the global clock cone using a monolithic delay prediction application.

12. The method of claim 11 wherein step (c) further includes:
    (i) using an output file from the delay calculation on the global clock cone and the design cones as input to parallel instances of delay prediction application.

13. The method of claim 12 wherein step (c) further includes:
    (ii) allocating one computer to run one instance of the delay prediction application, and using one instance of the delay prediction application to perform delay calculation on one design cone.

14. The method of claim 13 wherein step (c) further includes:
    (iii) starting the instances of the delay prediction application on all computers at the same time and running the instances of the application in parallel so that delay output files for all design cones are produced at approximately the same time.

15. The method of claim 14 wherein step (d) further includes:
    using scripts to merge the output file from the delay calculation on the global clock cone and the output files from the delay calculations on the design cones into a final output file.

16. A method for partitioning a netlist into timing-independent blocks of logic for distributed delay prediction, the method comprising:
    (a) initializing all data structures related to cone traversal;
    (b) finding a global clock cone;
    (c) finding design cones;
    (d) merging the design cones if a number of the design cones found is more than a number of computers available to perform the distributed delay prediction;
    (e) creating a clock network;
    (f) transforming the global clock cone into a writer cone and a write netlist;
    (g) transforming the design cones into writer cones and write netlists; and
    (h) generating for each cone a netlist, a prospective pin list file, and a force ramptime pin list file.

17. The method of claim 16 further including:
    (i) providing each netlist that was generated for each cone to one of the available computers, such that all of the available computers perform the delay prediction on the netlists in parallel.

18. The method of claim 17 wherein step (e) further includes:
    creating the clock network using multithreading.

19. The method of claim 18 wherein step (g) further includes:
    transforming the design cones using multithreading.

* * * * *